J. & H. L. CALLOW.
APPARATUS FOR DIVIDING AND MOLDING DOUGH AND OTHER PLASTIC MATERIAL.
APPLICATION FILED SEPT. 27, 1909.
1,131,329. Patented Mar. 9, 1915.
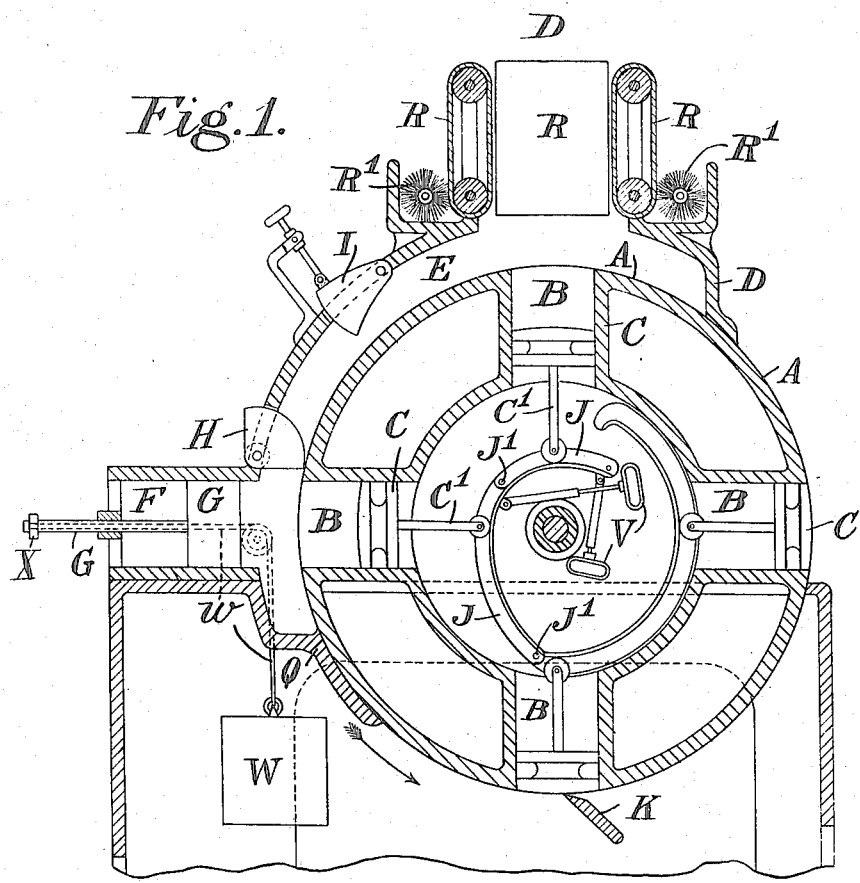
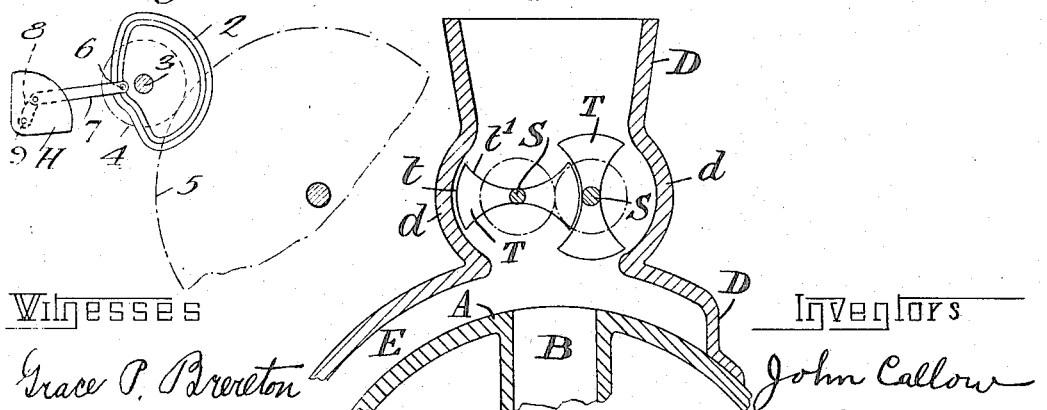

UNITED STATES PATENT OFFICE.

JOHN CALLOW AND HERSCHEL LIVINGSTONE CALLOW, OF LIVERPOOL, ENGLAND.

APPARATUS FOR DIVIDING AND MOLDING DOUGH AND OTHER PLASTIC MATERIAL.

1,131,329.  Specification of Letters Patent.  Patented Mar. 9, 1915.

Application filed September 27, 1909. Serial No. 519,870.

*To all whom it may concern:*

Be it known that we, JOHN CALLOW and HERSCHEL LIVINGSTONE CALLOW, subjects of the King of Great Britain, residing in Liverpool, in the county of Lancaster, in the Kingdom of England, engineers, have invented certain new and useful Improvements in Apparatus for Dividing and Molding Dough and other Plastic Material, of which the following is a specification.

This invention relates to dough dividing or molding apparatus, of that type in which the dough or other material is fed into cells in the circumference of a rotating drum or other moving surface, and compressed therein, and the material is discharged at intervals from the cells by plungers.

The object of the present invention is among other things, to provide certain improvements in such apparatus whereby the material will be divided and evenly compressed into lumps of any desired size and weight, and the occluded gases in the material compressed.

Our invention embodies the use of a rotating drum and an expansion chamber, an example of which is described and claimed in the specification of John Callow's Patent No. 749,023, dated January 5th, 1904.

A practical embodiment of our invention is represented in the accompanying drawing, in which—

Figure 1 is a vertical section of the machine, Fig. 2 a fragmentary sectional view embodying a modification. Fig. 3 is a detached view in elevation, of the cam for operating the valve H.

Referring first to Fig. 1, we provide a drum A, in which are any suitable number of receivers or cells B, or rows of such cells, and in each cell is fitted a plunger C. In proximity to the drum is a hopper D, made relatively large enough to supply the drum cells B, and so placed that the periphery of the drum A comes against the discharge end of the hopper D. The walls of the hopper D closely fit the drum, except at one side, where the hopper is extended in such a manner as to form a segmental space or charging chamber E, which extends about one-fourth part of the way around the drum or such farther distance that the rotation of the drum in conjunction with the opposing wall of the chamber E, will force increments of dough downward, and pack them into the cells. The distance the chamber E extends around the drum, depends somewhat on the constitution of the drum, but in most cases, the distance shown in the drawing is sufficient. This distance E has at or near one end, an expansion chamber F of known type, to take the excess of dough. The said charging chamber E may be of equal area throughout, or be of gradually decreasing area as it approaches the expansion chamber. The said expansion chamber F contains a plunger or piston G which is weight actuated, or spring actuated, in such a manner as to normally press it inward toward the drum. This can be effected by the weight or weights W pulling the cord w attached to the cross head X which is secured to the piston rod G' of the piston G. The piston G is likewise operated by a cam, which will at certain intervals, (namely when a cell or cells B comes opposite the expansion chamber F) be pushed forcibly inward toward the cells, so as to compress the material therein to a high pressure, and also compress the occluded gases within the material. This forcible pressure of the piston G inward, is greater than the pressure with which the material is carried forward in the direction in which the drum A rotates, and to prevent the material therefore being forced back from the expansion chamber F into the charging chamber E, we provide therein a non-return valve H. This valve is so arranged in the charging chamber, as to open and close, namely open to allow the dough to be carried forward, in the direction in which the drum A rotates, but close and prevent it being forced back, when the plunger G is forced forward by the cam, because then the force of the plunger is greater than the force with which the material is being fed forward. The valve H is preferably in the form of a quadrant. The valve is operated mechanically so as to open when the drum revolves, and close when it stops, as by a cam 2 rotated by a shaft 3, said shaft being geared by the wheels 4 and 5 to the shaft on which the drum is mounted, and the said wheels being so proportioned that the cam makes four revolutions to each revolution of the drum if, as is the case in the present instance, the cells are at four equidistant intervals in the drum periphery. The cam is made with a cam slot 2 in it of peculiar form, in which is engaged the pin 6 at the end of the connecting rod 7, the other end of the connecting rod being coupled to the crank 8 secured to the spindle 9 on which the valve H turns. As the cam rotates, the valve is opened by the increasing distance of the cam slot from the center 3, but in due course assumes its closed position again by the formation of the cam slot, and so this closing and opening takes place four times for each revolution of the drum. This valve H may be used without the expansion chamber F, and will with some doughs give sufficient pressure to give the required weight. In such case the valve is operated at intervals to impose a definite pressure on the dough in the receivers B, then oscillate back to permit more dough to pass.

The action of the drum A with its cells or pockets B, is arranged to pull the dough from the hopper D. The dough falls by gravity in the hopper, on to the drum surface A, and the latter in rotating, produces a pull on the dough in the hopper D, which draws the dough forward and forces it into the cells B, and into the segmental circular space or charging chamber E. At or near the beginning of this segmental circular space E, that is adjacent to the hopper D, we provide a shutter or slide I by which the opening into the said chamber E can be regulated, so that the supply of material can be adjusted by hand according to the requirements of the machine, that is when the weight has to be altered from larger to small pieces, the adjustable slide or shutter I is operated, so as to decrease the feed into the said chamber, or if the weight has to be altered from smaller pieces to larger, the adjustable slide is withdrawn somewhat. This is another important feature of our invention, as over-feeding would be liable to fell the dough, and under-feeding would not give the weight required. Thus we are able to regulate the feed according to the capacity of the cells B. The plungers C in the cells are operated through the action of a cam race J, against which the plungers' rods C' bear. This cam race J is jointed if required at J', and provided with means such as V for adjustment, so that the curves of the cam race J can be varied to operate the plungers C, to receive or expel larger or smaller quantities of dough, at the exact moment required. In one arrangement the cam race J is only provided for thrusting the plungers outward, the inward movement being obtained by the thrust of the dough from the hopper D and chamber F. Also the inward movement of the plungers in the cells that are being filled, may be used to thrust the opposite plungers outward to discharge the dough portions from the cells. Scraping blades K are provided to remove the dough from the periphery of the drum A.

The mode of action is as follows: The dough fed into the hopper D is drawn by the rotating drum A into the charging space E, the shutter or blade I having been first regulated to suit the weight of lumps required to be produced. At the same time the dough is forced into the cells B, and the plungers C in the cells B are forced back to the inner end thereof, while the material simultaneously collects in and fills the charging chamber E by the action of the rotating drum surface and its flanges, the surplus dough being extruded into the expansion chamber F whose loaded plunger G is forced back thereby. The said cells B, charging chamber E, and expansion chamber F, thus become evenly filled with dough. When a cell B comes opposite the expansion chamber F, then the other mechanism comes into play, which forces the piston G in the expansion chamber forward, and compresses the dough together with its occluded gases in the cells B to the pressure required to give uniform weight, the valve H in the said space E closing so as to prevent the dough being forced back into the charging chamber E. The cells B thus become completely and evenly filled with the dough and its occluded gases compressed, and as the drum A rotates, its cells B pass the end Q of the charging chamber E which has a shearing action in such manner as to separate the dough in the cells B from the dough in the said chamber E. Then as the drum A moves farther around, the compressed lumps of dough are extruded from the cells B by the cam-operated plunger C, the scraping blade K which is applied at a suitable point to the periphery of the drum A, removing the extruded dough, and transferring it to the carrier or hander-up. If the expansion chamber F be omitted, then the valve H in closing, acts to impose a definite pressure upon the dough in the receivers B. Instead of the shut off I for regulating the supply of dough to the charging chamber, other means may be used, and so vary the area of the inlet. It must be understood that for some classes of dough, the drum A or its equivalent, in conjunction with the charging chamber E is sufficient to give the desired result. The hopper D can be provided down its sides with a series of rollers, or with traveling bands R which move at the same rate, as the dough is fed, through the hopper, and thus prevent the dough sticking to the sides. The rollers or bands are moved by the friction of the dough or driven mechanically. The rollers or the traveling bands are kept dusted with flour, by means of any suitable dusting device R'.

The hopper D aforesaid, can if desired, have its opposite sides at one place d made in the segment of a circle (Fig. 2), and between these are two parallel shafts S which project into the hopper D, on which are fixed two forcing segments T. These by means of toothed wheels or otherwise are made to revolve at equal speeds. The ends $t$ of the forcing segments T are made circular and the sides $t'$ hollow, so that as they revolve, the circular ends $t$ of one in succession, fit in the hollow side $t'$ of the other and vice versa. The ends $t$ of the forcing segments T as they go around bear against the segmental circular sides $d$ of the hopper, and each bears alternately against the sides of the other. As the forcing segments T rotate, the dough is forced by them from the hopper into the chamber or space around the drum, and into the receivers in the drum.

We declare that what we claim is:—

1. In apparatus for dividing dough, the combination with a rotary drum provided with cavities therein and plungers arranged in said cavities with means for operating the same, of a hopper of smaller diameter than the drum and placed vertically thereover and a chamber concentric with the drum communicating with the hopper and extending over one of the upper quadrants of the drum and closed at the end, the walls of said chamber being fixed with respect to circumferential movement of the drum so that the feed takes place by reason of the pressure developed within the chamber owing to the rotation of the drum acting against the whole of the concentric fixed wall of the chamber.

2. In apparatus for dividing and molding dough or other plastic material, a rotatable drum carrying plungers, receivers in which said plungers work, a hopper, a segmental space or charging chamber extending part way around the drum which coöperates with the hopper and drum to feed the plastic material into the receivers, and a valve in said charging chamber so arranged and operating as to allow the dough to be carried forward when the drum rotates, but at intervals to close, and impose a definite pressure upon the dough in the receivers, said valve being in the form of an oscillating quadrant and opening alternately to allow the receivers to fill and closing to impart a definite pressure on the dough in the receivers.

3. In an apparatus for compressing and dividing dough and like plastic material, the combination with a continuously rotatable drum having plungers operating radially in cavities adapted to be filled by the rotation of the drum without application of external force, of a feeding device comprising a hopper placed above the center of the drum, traveling bands at the sides of said hopper mounted in such manner as to be automatically moved as the dough falls downward by the action of gravity, and a device for dusting said bands with flour, substantially as described.

In witness whereof, we have hereunto signed our names this 16 day of September, 1909, in the presence of two subscribing witnesses.

JOHN CALLOW.
HERSCHEL LIVINGSTONE CALLOW.

Witnesses:
F. L. RANDS,
R. F. WILLIAMS.